United States Patent [19]

Furukawa

[11] 4,406,472
[45] Sep. 27, 1983

[54] STEERING SYSTEM FOR VEHICLES

[75] Inventor: Yoshimi Furukawa, Tokyo, Japan

[73] Assignee: Honda Giken Kogyo Kabushiki Kaisha, Tokyo, Japan

[21] Appl. No.: 266,454

[22] Filed: May 22, 1981

[30] Foreign Application Priority Data

May 29, 1980 [JP] Japan ................................. 55-71778

[51] Int. Cl.³ .......................................... B62D 7/00
[52] U.S. Cl. .................................... 280/91; 280/96.1; 180/140
[58] Field of Search ................... 280/91, 92, 93, 95 R, 280/771, 773; 180/140; 74/44, 54, 105

[56] References Cited

U.S. PATENT DOCUMENTS 2,132,828 10/1938 Montambo ............................ 280/91
2,339,205  1/1944 Tapp ..................................... 280/91
2,366,122 12/1944 Mercé .................................. 280/91

OTHER PUBLICATIONS

SAE Journal, Jan. 1957, pp. 66-71, C. W. Lincoln, "Manual Steering Mechanisms from 1900 to 1951."

Primary Examiner—Robert R. Song
Assistant Examiner—Dennis H. Pedder
Attorney, Agent, or Firm—Irving M. Weiner; Pamela S. Burt; John L. Shortley

[57] ABSTRACT

A steering system for vehicle, comprising, in a steering force transmission route between a steering wheel and rear wheels of the vehicle, a crank mechanism having an input member, a movement-transmitting member connected to the input member, and an output member connected through a crank rod to the movement-transmitting member, the crank rod causing the output member to move linearly in response to the rotation of the input member. With respect to the steering angle of the steering wheel and that of the front wheels, the magnitude of the steering angle of the rear wheels can be freely selectively determined.

11 Claims, 4 Drawing Figures

STEERING SYSTEM FOR VEHICLES

BACKGROUND OF THE INVENTION

1. Field of the Invention

The present invention relates to a steering system for vehicles, and more particularly to a steering system in which both the front wheels and the rear wheels are steerable in response to steering rotation of the steering wheel.

2. Description of Relevant Art

In conventional steering systems for vehicles, generally only the front wheels are steered by operating the steering wheel. However, there has already been proposed a novel steering system in which both the front wheels and the rear wheels are steered by operating the steering wheel (see U.S. patent application Ser. Nos. 107,717 and 107,718 both filed Dec. 28, 1979 in the name of the present applicant, and now U.S. Pat. Nos. 4,313,514 and 4,295,657, respectively). In such novel steering system, the front wheels and rear wheels are both steered in the same direction within a relatively small steering angle range of the steering wheel and, on the other hand, for a relatively large steering angle range the rear wheels are steered in the opposite direction relative to the front wheels.

With the novel steering system as described hereinabove, various advantages have been attained. For example, the cornering forces causing yawing around the center of gravity of a vehicle are generated at the front wheels and rear wheels without delay therebetween, thus resulting in an improved response of the rear wheels. In addition, the direction of the vehicle substantially coincides with the tangential line of turning loci when the vehicle is turned, thus ensuring (together with the foregoing advantage) improved drivability with a ready grasp of the feeling necessary for steering. Further, the minimum turning radius of the vehicle can be remarkably reduced.

From a practical standpoint, it is desired that the novel steering system of the aforesaid type have a structure in which the steering angle of the rear wheels is selective with respect to the steering angle of the steering wheel or the steering angle of the front wheels, because a possible free selection of a steering angle ratio between the steering wheel or front wheels and rear wheels may provide improved practical operation. Moreover, when taking into consideration the fact that relatively large steering angles of the steering wheel are experienced mainly at low driving speeds, such as when the vehicle is being driven into a garage, is approaching a road side, and/or is starting from a road side where it has been parked, it is advantageous for a certain type of vehicle to have, in a relatively large steering angle range of the steering wheel, only the front wheels steered, without the rear wheels being steered in the opposite direction relative to the front wheels, i.e., holding the steering angle of the rear wheels at or in the vicinity of zero degrees. If the system fulfills such a requirement for the steering of the rear wheels, further preferable results would thus be attainable.

SUMMARY OF THE INVENTION

It is an object of the present invention to provide a steering system for vehicles wherein, with respect to the steering angle of a steering wheel and that of the front wheels, the magnitude of the steering angle of the rear wheels can be freely selectable, i.e., the steering angle ratio between the front and rear wheels is variable and selective. In accordance with the present invention, at relatively large steering angles of the steering wheel it is possible for the vehicle to have the rear wheels steered in the opposite direction relative to the front wheels, or alternatively to hold the steering angle of the rear wheels at or in the vicinity of zero degrees with only the front wheels being steered, while at relatively small steering angles of the steering wheel the rear wheels are steered in the same direction as the front wheels, thus improving the maneuverability of the vehicle and the driving comfort.

In order to attain the aforesaid object, a steering system according to the present invention comprises as a distinctive feature thereof a crank mechanism comprising, in a steering force transmission route between a steering wheel and the rear wheels, an input member, a movement-transmitting member connected to the input member, and an output member connected through a crank rod to the movement-transmitting member, the crank rod causing the output member to move linearly in response to the rotation of the input member.

Other objects and details of the present invention will become apparent from the following detailed description, when read in conjunction with the accompanying drawings.

DETAILED DESCRIPTION OF PREFERRED EMBODIMENTS

Figure 1:
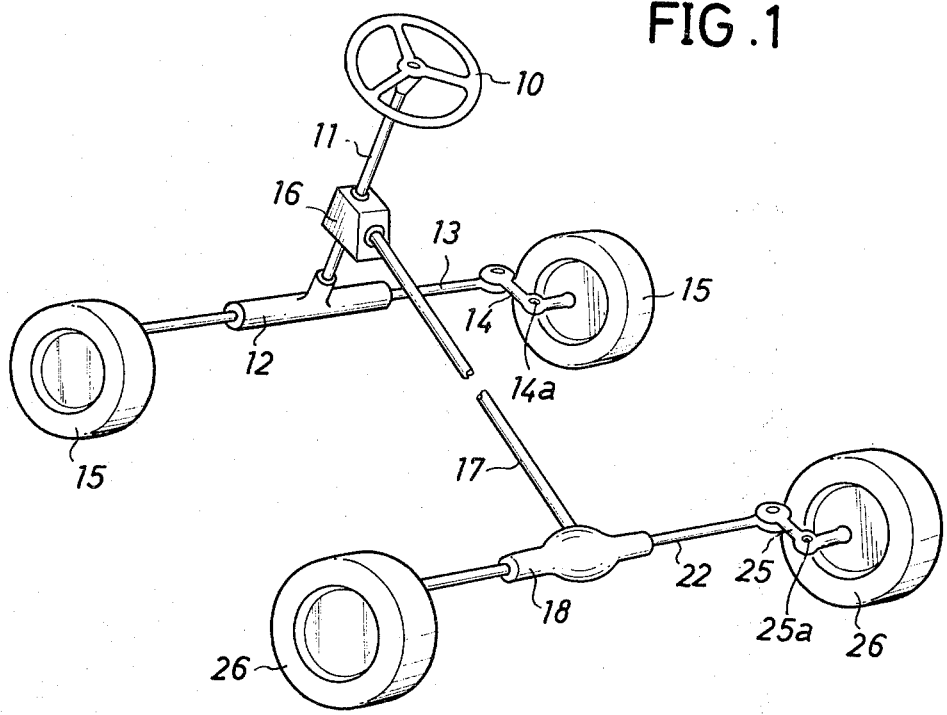
FIG. 1 is a perspective view illustrating the basic construction of a vehicle having a steering system according to a preferred embodiment of the present invention.

With reference to FIG. 1, the top end of a steering shaft 11 has connected thereto a steering wheel 10 which is turned for steering operation by the driver, and a lower part of the steering shaft 11 is inserted into a gear box 12. The gear box 12 has a rod member 13 extending therethrough so as to be transversely linearly movable, the steering shaft 11 and the rod member 13 being operatively connected with each other in the gear box 12 through a steering force transmission direction-changing mechanism of a rack-and-pinion type. The rod member 13 serves as a front wheel tie rod. The right and left front wheels 15, 15 are each connected to a knuckle arm member 14 horizontally pivotable about a fixed pivot 14a. When the steering wheel 10 is rotatably operated, a corresponding amount of rotation of the steering shaft 11 is transformed through the gear box 12 into a linear transverse movement of the rod member 13, thereby forcing the front wheels 15, 15 to be rotated rightwardly or leftwardly by a corresponding pivotal movement of the knuckle arm members 14 which are connected to the respective ends of the rod member 13. Such front wheel steering mechanism is generally known in the art.

Another gear box 16 is disposed at the longitudinally central portion of the steering shaft 11 and an input shaft 17 is extended rearwardly from the gear box 16. The input shaft 17 is used as an input member of a crank mechanism (described hereinbelow) and is connected to the steering shaft 11 through a rotating force transmission direction-changing mechanism arranged in the gear box 16, which mechanism may comprise a bevel gear or a worm gear, and whereby the steering force is transmitted as a torque to the input shaft 17 from the steering shaft 11. The input shaft 17 has its rear end inserted into a crank case 18.

Figure 2:
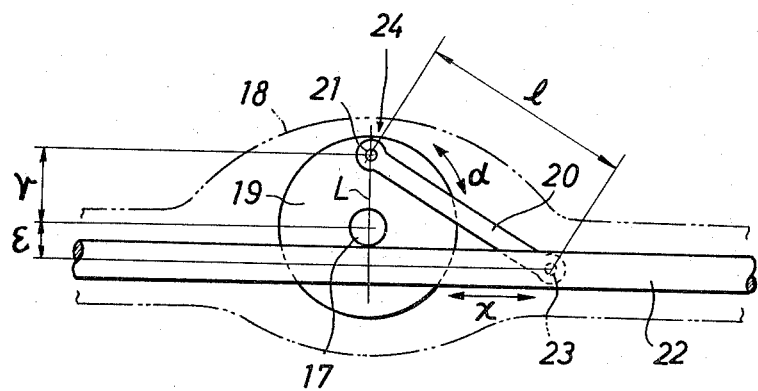
FIG. 2 is a view illustrating a crank mechanism as seen from behind the vehicle.

Referring now to FIG. 2, there is illustrated an internal structure of the crank case 18 which accommodates a movement-transmitting member 19 and a crank rod 20, the movement-transmitting member 19 being connected to the rear end of the input shaft 17. In FIG. 2, the movement-transmitting member 19 is shown in the form of a disc plate secured at the center thereof to the input shaft 17. However, the transmitting member 19 is not limited to the dics-like shape, and may have an arbitrary configuration, providing that the member 19 has a substantial and effective perpendicular length with respect to the input shaft 17. The crank rod 20 has one end thereof pivotally connected by a pin 21 to an outer end portion of the movement-transmitting member 19 at a point perpendicularly spaced from the input shaft 17, and the other end thereof pivotally connected through a pin 23 to an output rod 22 which is provided through the crank case 18 in a transversely linearly movable manner and arranged to cross the input shaft 17 at right angles. The output rod 22 serves as an output member of a crank mechanism 24 as mentioned above. The crank mechanism 24 comprises the input shaft 17, the movement-transmitting member 19, the output rod 22, and the crank rod 20 connecting the movement-transmitting member 19 with the output rod 22.

The output rod 22 further serves as a tie rod for the rear wheels 26, 26 and thus the crank mechanism 24 forms a part of a steering force transmission route between the steering wheel 10 to the rear wheels 26. The right and left rear wheels 26, 26 are each connected to a knuckle arm member 25 which is horizontally pivotable about a pivot 25a. When the output rod 22 is caused to make a linear transverse movement, the rear wheels 26, 26 are both steered rightwardly or leftwardly according to a corresponding pivotal motion of the knuckle arm members 25 connected to either end of the output rod 22.

FIG. 2 shows a state of the steering system in which the steering wheel 10 is set at its neutral position prior to the steering operation and, in this case, the connection point at which the movement-transmitting member 19 and crank rod 20 are connected with each other by the pin 21 is located at a position where a line segment L extending from the input shaft 17 to the above connection point forms right angles with the output rod 22. When the steering wheel 10 is steered, the rotation thereof is transmitted via gear box 16 to the input shaft 17 and in turn a corresponding rotation of the input shaft 17 is effected via crank rod 20 to the output rod 22, thus resulting in a linear movement of rod 22 and thereby causing the rear wheels 26, 26 to be steered.

In the arrangement described hereinabove, a device similar to a conventional auxiliary power steering device for front wheel steering may be applied to assist the steering of the rear wheels.

With respect to FIG. 2, the following equation can be formed:

$$\frac{\chi}{l} = \frac{\gamma}{l} \sin\alpha - \frac{1}{2}\left(\frac{\gamma}{l}\right)^2 \sin^2\alpha + \left(\frac{\gamma}{l}\right)^2 \cdot \left(\frac{\epsilon}{\gamma}\right)(1 - \cos\alpha)$$

where $l$ is the effective length of the crank rod 20, $\gamma$ is the distance from the center of rotation of the input shaft 17 to the connection point of the crank rod 20 on the side of the pin 21, i.e., the radius of rotation of the crank rod 20 relative to the input shaft 17, $\epsilon$ is the eccentric distance in the direction perpendicular to the linear movement of the output rod 22 from the center of rotation of the input shaft 17 to another connection point of the crank rod 20 at which rod 20 and the output rod 22 are connected with each other by the pin 23, and $\chi$ is a displacement of the output rod 22 to be caused when the input shaft 17 is rotated by an angle of $\alpha°$.

Figure 3:
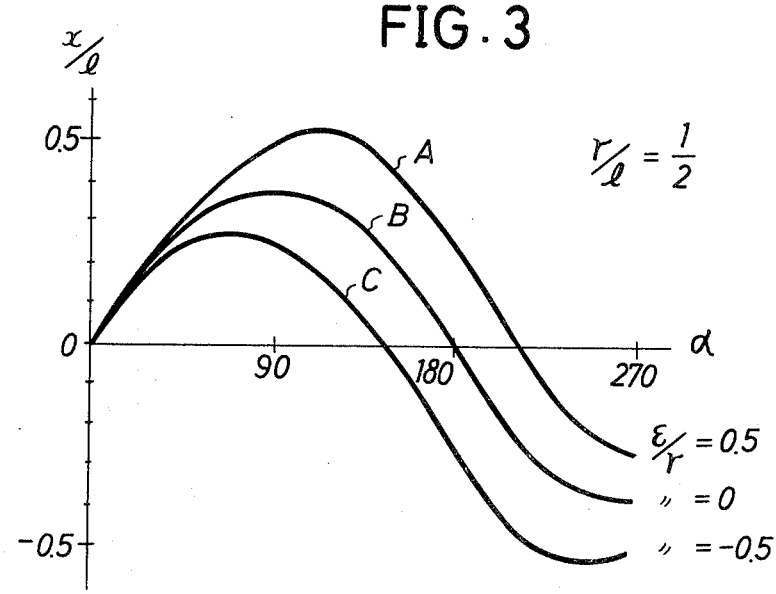
FIG. 3 is a graph representing a characteristic of a crank mechanism.

FIG. 3 is a graph showing the above equation, in which the abscissa represents the angle $\alpha°$ and the ordinate represents a ratio $\chi/l$. This graph represents a case in which a parameter $\gamma/l$ is $\frac{1}{2}$. Designated at A, B and C are curves for various values of an eccentricity $\epsilon/\gamma$ and correspond to cases in which $\epsilon/\gamma$ is 0.5, zero, and $-0.5$, respectively. The cases in which $\epsilon/\gamma = 0.5$ and $-0.5$, respectively, differ from each other in that the connection point between the crank rod 20 and output rod 22 is located, with respect to a line parallel with the output rod 22 and including the center of rotation of the input shaft 17, i.e., on the same side as or on the rear side relative to the connection point between the movement-transmitting member 19 and crank rod 20 in the former case and on the opposite side thereto or on the far side therefrom in the latter case. In the case where $\epsilon/\gamma = 0$, the connection point between the crank rod 20 and output rod 22 lies on the above line parallel with the output rod 22 or the linear movement thereof and including the center of rotation of the input shaft 17.

As apparent from FIG. 2, it is possible to vary the ratio $\chi/l$ at the same angle of rotation of the input shaft 17 by changing the eccentricity $\epsilon/\gamma$. In other words, the ratio $\chi/l$ is variable or can take different values by changing $\epsilon/\gamma$ even for the same angle of rotation of the steering wheel 10. Because the length $l$ is a constant, it follows that the displacement $\chi$ of the output rod 22 is likewise variable and thus the magnitude of steering angle of the rear wheels 26 can be suitably varied from vehicle to vehicle by changing the eccentricity $\epsilon/\gamma$ as circumstances require. Namely, the magnitude of the steering angle of the rear wheels 26 relative to the steering angle of steering wheel 10 or that of front wheels 15 can be optionally selected for each vehicle. As a matter of course, the magnitude of the steering angle of rear wheels 26 may be selected by changing $\gamma$ and $l$. As shown in the graph of FIG. 3, which covers a range of the angle $\alpha°$ between 0° and 270°, the ratio $\chi/l$ of each curve has its value changed from positive to negative near an angle of 180°, i.e., the steering direction of rear wheels 26 is variable with respect to the front wheels 15 such the front wheels 15 and rear wheels 26 are steered in the same direction at relatively small angles of $\alpha°$ at relatively small steering angles of the steering wheel 10) and, to the contrary, are steered in opposite directions at relatively large angles of $\alpha°$ (at relatively large steering angles of the steering wheel 10). It is also possible to design the steering system such that, in a specific range of relatively large steering angles of steering wheel 10, the steering angle of rear wheels 26 can be restored to or near zero, while that of front wheels 15 is varied. In other words, by changing the eccentricity $\epsilon/\gamma$ it becomes possible, for each vehicle, to select specific steering angles of steering wheel 10 which render the steering angle of the rear wheels to be zero or near zero, for the convenience of steering operation, such as when entering a garage, approaching a road side, and/or starting from a road side where the vehicle has been parked.

In addition to changing the eccentricity $\epsilon/\gamma$, it is also possible by arranging speed-changing means in the crank mechanism 24 to select specific steering angles of steering wheel 10 at which the steering angle of rear wheels 26 will be restored to or near zero. The speed-changing means may be disposed between the input shaft 17 and movement-transmitting member 19, or, if the input shaft 17 is defined by two shafts, between such two shafts.

As will be understood from the foregoing, the steering system in accordance with the invention enables, besides the steering of steering wheel 10, that of rear wheels 26 relative to that of front wheels 15 due to that of steering wheel 10 to be performed in accordance with the desired requirements.

In the graph of FIG. 3, only positive values of $\alpha°$ are covered. However, the steering of the rear wheels can also be likewise performed at negative values of $\alpha°$.

Figure 4:
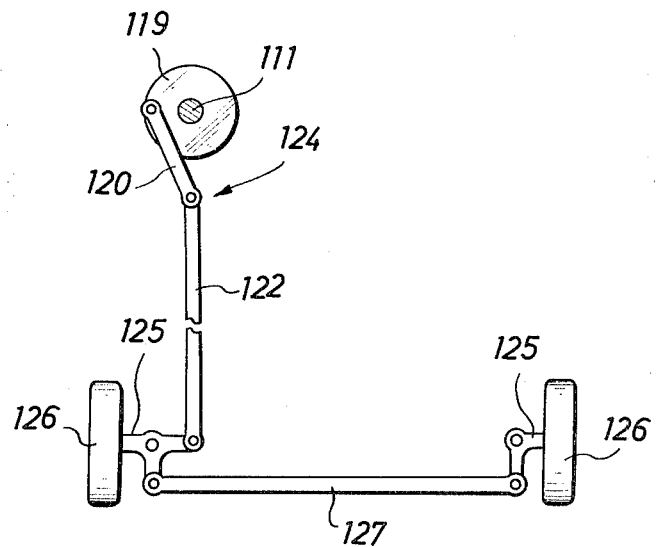
FIG. 4 is a top plan view illustrating a vehicle having a steering system according to another preferred embodiment of the present invention, with a steering wheel, front wheels, etc., being omitted.

With reference to FIG. 4, there is shown a crank mechanism 124 which, like the crank mechanism 24 of the preceding embodiment, comprises an input member 111 rotated by the steering of a steering wheel (not shown), a movement-transmitting member 119, an output member 122 which is linearly movable, and a crank rod 120 connecting the movement-transmitting member 119 to the output member 122. In this embodiment, the input member 111 corresponds to the steering shaft 11 connected to the steering wheel 10, both as shown in FIG. 1. Thus, the crank mechanism 124 is arranged in the front portion of the vehicle. The output member 122, which lies perpendicular to the input member 111, is extended rearwardly to have its rear end connected to one of a pair of knuckle arm members 125, 125 provided for the right and left rear wheels 126, 126. With rotation of the input member 111, a corresponding longitudinal linear movement of the output member 122 forces the pair of knuckle arm members 125, 125 connected with each other by a tie rod 127 to pivotally move, thus causing the right and left rear wheels 126, 126 to be steered. In such an arrangement, the output member 122 serves as a compression/tension rod to which an axial load is applied.

It is also to be noted in connection with this embodiment that a power steering device may be applied as auxiliary rear wheel steering means, and further, speed-changing means similar to that of the preceding embodiment may be arranged in the crank mechanism 124.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A steering system for a vehicle through which both front and rear wheels of said vehicle are steered by operation of a steering wheel such that said rear wheels are steered in the same steering directions as said front wheels when the turning angles of said steering wheel are relatively small, and in the opposite directions to the steering directions of said front wheels when the turning angles of said steering wheel are relatively large, with the rear wheel steering angle in the latter case including substantially zero, comprising:
   a crank mechanism comprising:
      an input member rotatable by the rotating operation of said steering wheel;
      a movement-transmitting member connected to said input member and having a substantially perpendicular length with respect to said input member;
      a crank rod pivotably connected at one end thereof to an outer end portion of said movement-transmitting member substantially perpendicularly spaced from said input member; and
      an output member connected to the other end of said crank rod and linearly movable; and
   said crank mechanism being arranged in a steering force transmission route between said steering wheel and said rear wheels.

2. A steering system according to claim 1, wherein: said output member is arranged to cross said input member at substantially right angles.

3. A steering system according to claim 2, wherein: the connection point between said movement-transmitting member and said crank rod is located, when said steering wheel is in a neutral position thereof, at a position where a line segment connecting said connection point and said input member forms substantially right angles with said output member.

4. A steering system according to claim 3, wherein: said crank mechanism further includes speed-changing means.

5. A steering system according to claim 3, wherein: said rear wheels are steered by the aid of a power steering device.

6. A steering system according to claim 3, wherein: the connection point between said output member and said crank rod is deviated substantially perpendicularly from said input member with respect to the direction in which said output member is linearly movable.

7. A steering system according to claim 6, wherein:

$$\epsilon/\gamma \geq 0$$

where $\gamma$ is the distance from the center of rotation of said input member to the connection point between said movement-transmitting member and said crank rod, and $\epsilon$ is the eccentric distance in the direction perpendicular to the linear movement of said output member from the center of rotation of said input member to the connection point between said crank rod and said output member.

8. A steering system according to claim 6, wherein:

$$\epsilon/\gamma < 0$$

wherein $\gamma$ is the distance from the center of rotation of said input member to the connection point between said movement-transmitting member and said crank rod, and ε is the eccentric distance in the direction perpendicular to the linear movement of said output member from the center of rotation of said input member to the connection point between said crank rod and said output member.

9. A steering system for a vehicle including front wheels and rear wheels both steerable by rotating operation of a steering wheel, comprising:
a crank mechanism comprising:
an input member rotatable by the rotating operation of said steering wheel;
a movement-transmitting member connected to said input member and having a substantially perpendicular length with respect to said input member;
a crank rod connected at one end thereof to an outer end portion of said movement-transmitting member substantially perpendicularly spaced from said input member; and
an output member connected to the other end of said crank rod and linearly movable;
said crank mechanism being arranged in a steering force transmission route between said steering wheel and said rear wheels;
the connection point between said movement-transmitting member and said crank rod being located, when said steering wheel is in a neutral position thereof, at a position where a line segment connecting said connection point and said input member forms substantially right angles with said output member; and
the connection point between said output member and said crank rod coinciding with said input member with respect to the direction in which said output member is linearly movable.

10. A steering system for a vehicle including front wheels and rear wheels both steerable by rotating operation of a steering wheel, comprising:
a crank mechanism comprising:
an input member rotatable by the rotating operation of said steering wheel;
a movement-transmitting member connected to said input member and having a substantially perpendicular length with respect to said input member;
a crank rod connected at one end thereof to an outer end portion of said movement-transmitting member substantially perpendicularly spaced from said input member; and
an output member connected to the other end of said crank rod and linearly movable;
said crank mechanism being arranged in a steering force transmission route between said steering wheel and said rear wheels;
the connection point between said movement-transmitting member and said crank rod being located, when said steering wheel is in a neutral position thereof, at a position where a line segment connecting said connection point and said input member forms substantially right angles with said output member; and
said input member comprising a shaft member connected to a steering shaft of said steering wheel and extended rearwardly, and said output member comprising a rear wheel tie rod.

11. A steering system for a vehicle including front wheels and rear wheels both steerable by rotating operation of a steering wheel, comprising:
a crank mechanism comprising:
an input member rotatable by the rotating operation of said steering wheel;
a movement-transmitting member connected to said input member and having a substantially perpendicular length with respect to said input member;
a crank rod connected at one end thereof to an outer end portion of said movement-transmitting member substantially perpendicular spaced from said input member; and
an output member connected to the other end of said crank rod and linearly movable;
said crank mechanism being arranged in a steering force transmission route between said steering wheel and said rear wheels;
the connection point between said movement-transmitting member and said crank rod being located, when said steering wheel is in a neutral position thereof, at a position where a line segment connecting said connection point and said input member forms substantially right angles with said output member; and
said input member comprising a steering shaft of said steering wheel, and said output member comprising a compression/tension rod extended rearwardly and connected to a knuckle arm member of a rear wheel.

* * * * *